United States Patent
Kudallur et al.

(10) Patent No.: US 9,015,496 B2
(45) Date of Patent: *Apr. 21, 2015

(54) MIME HANDLING SECURITY ENFORCEMENT

(71) Applicant: Microsoft Corporation, Redmond, WA (US)

(72) Inventors: Venkatraman V. Kudallur, Redmond, WA (US); Shankar Ganesh, Bellevue, WA (US); Roberto A. Franco, Seattle, WA (US); Vishu Gupta, Redmond, WA (US); John Green Bedworth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,404

(22) Filed: Feb. 3, 2014

(65) Prior Publication Data

US 2014/0150121 A1    May 29, 2014

Related U.S. Application Data

(63) Continuation of application No. 12/685,528, filed on Jan. 11, 2010, now Pat. No. 8,646,078, which is a continuation of application No. 10/873,576, filed on Jun. 22, 2004, now Pat. No. 7,660,999.

(51) Int. Cl.
| | |
|---|---|
| *G06F 21/00* | (2013.01) |
| *G06F 11/00* | (2006.01) |
| *G06F 21/60* | (2013.01) |
| *G06F 21/56* | (2013.01) |

(52) U.S. Cl.
CPC .............. *G06F 21/60* (2013.01); *G06F 21/56* (2013.01); *G06F 21/566* (2013.01); *G06F 21/562* (2013.01)

(58) Field of Classification Search
None
See application file for complete search history.

(56) References Cited

U.S. PATENT DOCUMENTS

| | | | |
|---|---|---|---|
| 5,911,776 A | 6/1999 | Guck | |
| 6,901,519 B1 * | 5/2005 | Stewart et al. | .................. 726/24 |
| 7,228,307 B2 | 6/2007 | Dettinger | |
| 7,263,561 B1 | 8/2007 | Green et al. | |
| 7,328,456 B1 * | 2/2008 | Szor et al. | ........................ 726/26 |

(Continued)

OTHER PUBLICATIONS

"Notice of Allowance", U.S. Appl. No. 12/685,528, Sep. 23, 2013, 11 pages.

(Continued)

*Primary Examiner* — Fatoumata Traore
(74) *Attorney, Agent, or Firm* — Kate Drakos; Micky Minhas

(57) ABSTRACT

A model restricts un-trusted data/objects from running on a user's machine without permission. The data is received by a protocol layer that reports a MIME type associated with the DATA, and caches the data and related cache file name (CFN). A MIME sniffer is arranged to identify a sniffed MIME type based on the cached data, the CFN, and the reported MIME type. Reconciliation logic evaluates the sniffed MIME type and the CFN to determine a reconciled MIME type, and to update the CFN. A class ID sniffer evaluates the updated CFN, the cached data, and the reconciled MIME type to determine an appropriate class ID. Security logic evaluates the updated CFN, the reported class ID, and other related system parameters to build a security matrix. Parameters from the security matrix are used to intercept data/objects before an un-trusted data/object can create a security breach on the machine.

20 Claims, 6 Drawing Sheets

(56) References Cited

U.S. PATENT DOCUMENTS

| | | | |
|---|---|---|---|
| 7,660,999 | B2 | 2/2010 | Kudallur |
| 8,646,078 | B2 | 2/2014 | Kudallur et al. |
| 2001/0056444 | A1 | 12/2001 | Ide et al. |
| 2006/0242703 | A1 | 10/2006 | Abeni |
| 2010/0107251 | A1 | 4/2010 | Kudallur |

OTHER PUBLICATIONS

"Non Final Office Action", U.S. Appl. No. 10/873,576, Mar. 14, 2008, 16 pages.

"Final Office Action", U.S. Appl. No. 10/873,576, Dec. 17, 2008, 18 pages.

"Non-Final Office Action", U.S. Appl. No. 12/685,528, Jun. 28, 2011, 21 pages.

"Non-Final Office Action", U.S. Appl. No. 12/685,528, Dec. 30, 2011, 23 pages.

"Final Office Action", U.S. Appl. No. 12/685,528, Jun. 18, 2012, 31 pages.

"Non Final Office Action", U.S. Appl. No. 10/873,576, Jun. 1, 2009, 6 pages.

"Notice of Allowance", U.S. Appl. No. 10/873,576, Sep. 21, 2009, 9 pages.

Harding, et al.,' "MIME-based Secure Peer-to-Peer Business Data Interchange over the Internet", Gartner Group, Standards Track, Sep. 2002, 29 pages.

Lockwood, et al.,' "Internet Worm and Virus Protection in Dynamically Reconfigurable Hardware", Military and Aerospace Programmable Logic Device (MAPLD), Washington D.C., 2003, Paper E10, Sep. 2003, 9 pages.

McDaniel, et al.,' "Content Based File Type Detection Algorithms", IEEE, Proceedings of the 36th Hawaii International Conference on System Sciences(HICSS'03), 2002, 10 pages.

Wang, et al.,' "On Computer Viral Infection and the Effect of Immunization", Department of Computer Science, University of Virginia, 2000, 12 pages.

\* cited by examiner

| DC | CFE | Doc Host | Registered Types | | UI Definitions | | |
|---|---|---|---|---|---|---|---|
| | | | Class ID Type | CFE Type | Open Save | Danger Level | Persist |
| D1 | WAV | Y | T1 | T1 | Y | 1 | Y |
| D2 | MP3 | Y | T1 | T1 | Y | 1 | Y |
| D3 | JPG | N | T5 | T9 | Y | 3 | Y |
| - | EXE | N | T5 | T5 | Y | 9 | N |
| ⋮ | ⋮ | ⋮ | ⋮ | ⋮ | ⋮ | ⋮ | ⋮ |
| - | ARC | N | - | - | Y | 9 | N |

FIG. 4B

MIME HANDLING SECURITY ENFORCEMENT

CROSS REFERENCE

This application is a continuation of and claims priority to U.S. patent application Ser. No. 12/685,528, filed on Jan. 11, 2010, which claims priority to U.S. patent application Ser. No. 10/873,576, now U.S. Pat. No. 7,660,999, filed on Jun. 22, 2004, which are incorporated by reference in their entirety.

FIELD OF THE DISCLOSURE

A system and method is described that restricts access for downloading, saving, and executing data based on a security enforcement model. The security enforcement model evaluates information related to the data such as (some or all of): the multipurpose internet mail exchange (MIME) type, any class identifiers, the cache-file extension, and the data itself. Inconsistencies in the evaluated information are reviewed to asses risk associated with allowing the user to access the data. Actions related to the data can be allowed or disallowed once the risk has been assessed, where the user can optionally be prompted for each action by an appropriate user interface (UI) trap.

BACKGROUND

The hypertext markup language (or HTML) is commonly used to define the structure for presenting content in a webpage. Web pages that are prepared using HTML can be viewed with a variety of web browser application programs. In addition, HTML web pages can be viewed on different computing systems that may otherwise be incompatible with one another. As such, HTML has been adopted throughout the computing community as a common platform for web page development to provide transportability of content between computing systems.

HTML employs a set of standard codes or "markup tags" that are used to define the format (e.g., text color, font size, etc.) and location associated with text, images, and other content. In general, a web browser builds a web page by retrieving the text file associated with the web page and interpreting the markup tags in the text file to format the web page for viewing. An example web page typically includes text, graphic images, and links to other web pages. Graphics images and remote executable programs such as binary executables are downloaded onto the local machine so that the web page can be built appropriately.

Typical web browsers will prompt a user for a decision on installing executable programs that are necessary for the display of content associated with a web page. Example executables include plug-ins, active-x controls, as well as others. In some instances, the web browser does not prompt the user for a decision based on MIME type information that is being reported to the browser. For example, a .JPG file is a graphics image that may be associated with an HTTP request. In this example, the web browser will simply display the image without requiring user interaction.

SUMMARY

Briefly stated, a model is described that restricts un-trusted data/objects from running on a user's machine without permission. The data is received by a protocol layer that reports a MIME type associated with the DATA, and caches the data and related cache file name (CFN). A MIME sniffer is arranged to identify a sniffed MIME type based on the downloaded data, the CFN, and the reported MIME type. Reconciliation logic evaluates the sniffed MIME type and the CFN to determine a reconciled MIME type, and to update the CFN. A class ID sniffer evaluates the updated CFN, the cached data, and the reconciled MIME type to determine an appropriate class ID. Security logic evaluates the updated CFN, the reported class ID, and other related system parameters to build a security matrix. Parameters from the security matrix are used to intercept data/objects before an un-trusted data/object can create a security breach on the machine.

A more complete appreciation of the present invention and its improvements can be obtained by reference to the accompanying drawings, which are briefly summarized below, and to the following detailed description of illustrative embodiments, and to the appended claims.

BRIEF DESCRIPTION OF THE DRAWINGS

Non-limiting and non-exhaustive embodiments of the present invention are described with reference to the following drawings.

FIG. 4B is an illustration of an example security matrix in tabular form; and

DETAILED DESCRIPTION

Figure 1:
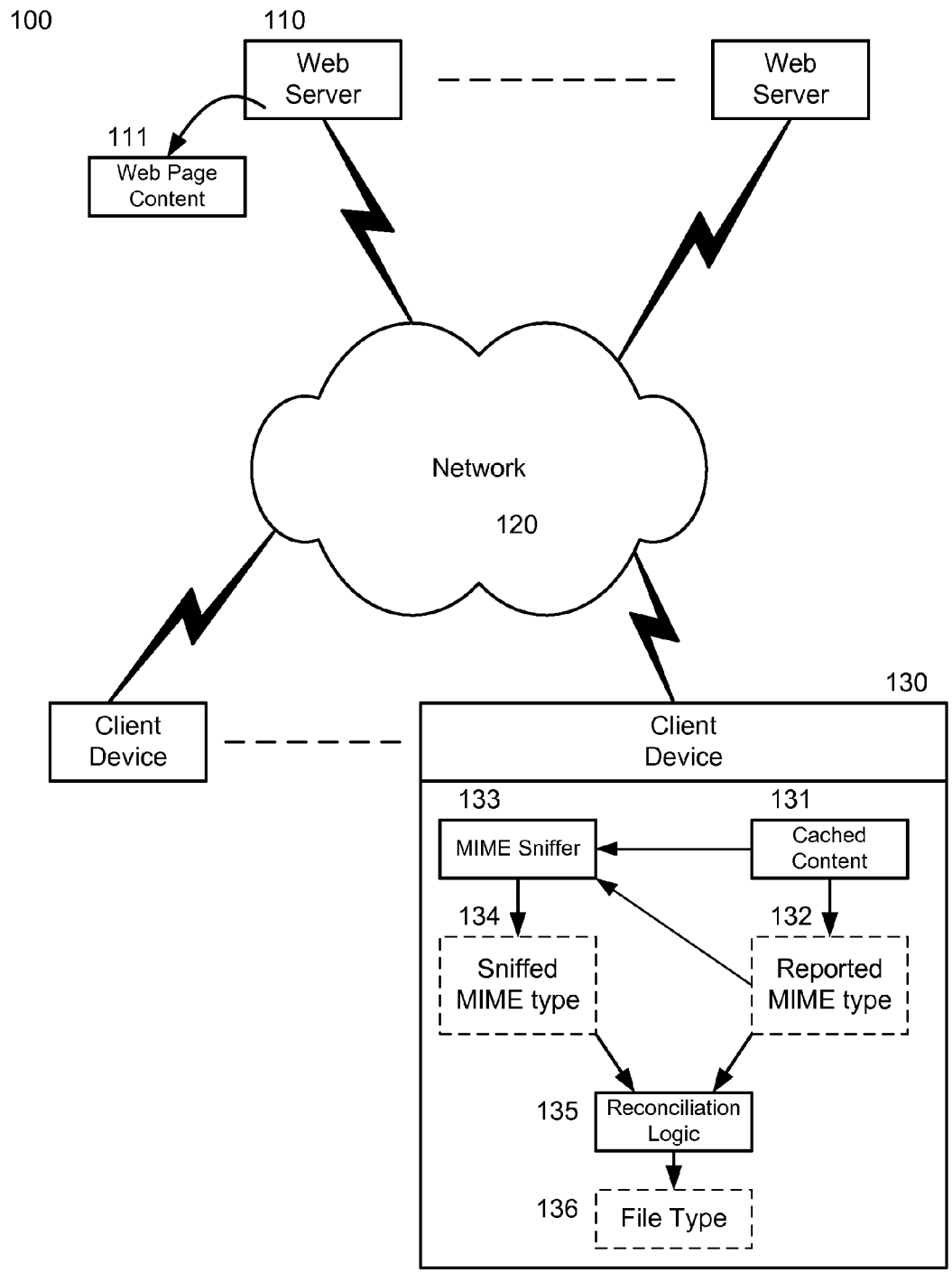
FIG. 1 is a diagram illustrating an example operating environment.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments.

Security is an important issue to consider when implementing web browsers and other similar technologies. Problematic security risks exist such as computer viruses, Trojan horse programs, computer worms, and email replicators to name a few. Improved security for email and web browsers is desirable to prevent destruction/corruption of data, as well as preventing identity theft.

In an effort to prevent unauthorized access to computer systems various protection mechanisms have been developed such as firewall programs, anti-virus programs, and anti-spyware programs. Traditional security models have also been implemented to limit the execution and/or installation of software based on user permission levels.

A security enforcement model is described that uses multipurpose internet mail exchange (MIME) type information. Security restrictions are imposed on downloading and executing a file based on an authentication of its reported MIME type. The reported MIME type is evaluated to identify inconsistent, corrupt, or otherwise un-trusted data. Data with a reported MIME type that is un-trusted is given a revised file extension that corresponds to a reduced security exposure such that a dangerous security risk is averted.

Example Operating Environment

An example operating environment is illustrated in FIG. 1. As show in the figure, one or more web server devices (110) can communicate content (111) over a network (120), where the content includes or references at least one executable behavior. One or more client devices (130) can receive the content (111) from the network (120) and create a locally cached copy (131) of the content. The locally cached content (131) is processed on the client device (130) and parsed through a security manager before executable behaviors are permitted.

The example operating environment is described in the context of client and server computing devices that communicate content (e.g., web pages) over a communication medium such as an internet, intranet, or some other network connection topology. The terms "client" and "server" refer to one instance of the method. However, the same device may play both a "client" and a "server" role in different instances. Generally speaking, any machine can be arranged to enforce the security model that is described herein.

Figure 2:
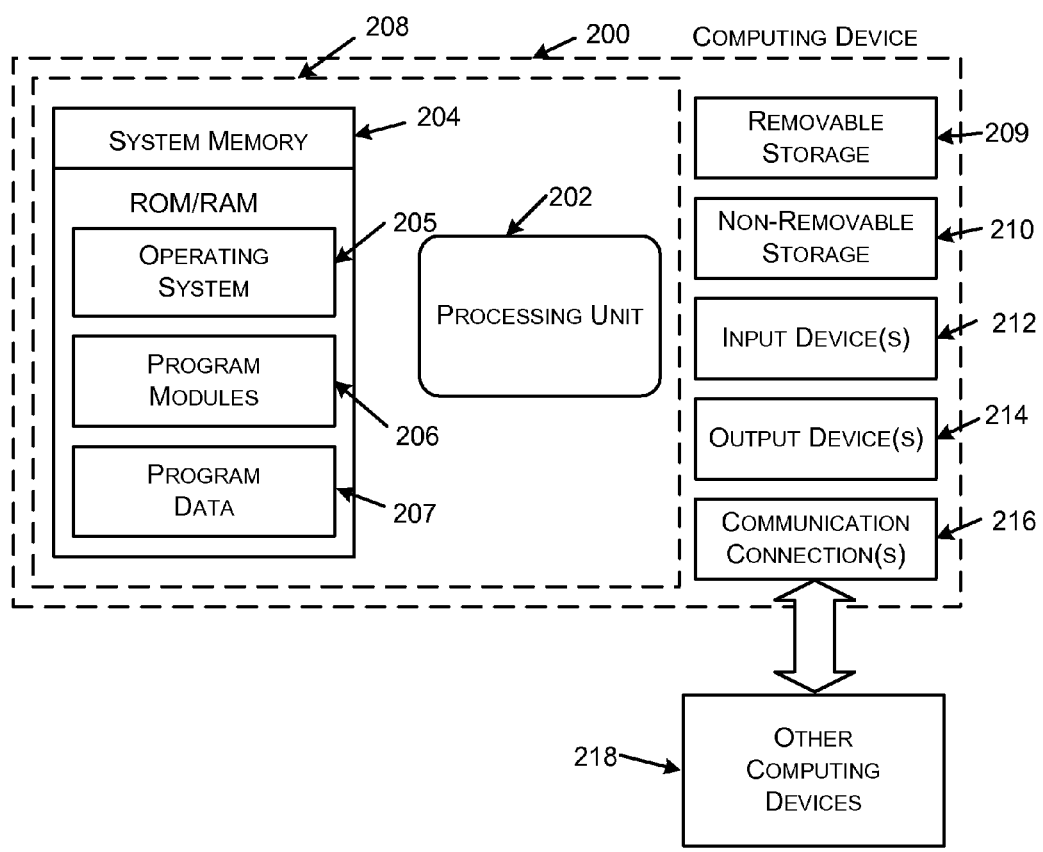
FIG. 2 is a diagram illustrating an example computing device.

Content that is provided to the machine may contain an executable that may pose an undesirable security risk. Before allowing the download, storage, and/or execution of questionable data (content), a security manager on the local machine (client 130) applies a series of security metrics to verify the data's integrity. The content (data) is initially cached by a protocol layer in the client device. A MIME sniffer (133) is arranged to evaluate the cached content, the file name associated with the cached content, and a reported MIME type (132) to identify a sniffed MIME type (134). Reconciliation logic (135) compares the reported MIME type (132) and the sniffed MIME type (134) to identify inconsistencies. The file name (or file type) can be updated based on any identified inconsistencies. The security model employed by the machine (client 130) can be utilized to verify executable file types (both shell execute and hosted executables) and to prevent undesirable files from accessing the machine Example Computing Device FIG. 2 is a block diagram of an example computing device that is arranged in accordance with the present invention. In a basic configuration, computing device 200 typically includes at least one processing unit (202) and system memory (204). Depending on the exact configuration and type of computing device, system memory 204 may be volatile (such as RAM), non-volatile (such as ROM, flash memory, etc.) or some combination of the two. System memory 204 typically includes an operating system (205); one or more program modules (206); and may include program data (207). This basic configuration is illustrated in FIG. 2 by those components within dashed line 208.

Computing device 200 may also have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and non-volatile, removable and non-removable media implemented in any method or technology for storage of information, such as computer readable instructions, data structures, program modules or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included.

Computing device 200 also contains communications connection(s) 216 that allow the device to communicate with other computing devices 218, such as over a network. Communications connection(s) 216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Various procedures and interfaces may be implemented in one or more application programs that reside in system memory 204. In one example, the application program includes a MIME security manager in a local computing device (e.g., a client device) that is arranged to apply security restrictions to limit access to the machine for downloading files, opening files, executing programs, or otherwise compromising security of the machine Example application programs that may employ a MIME security manager in memory 204 include: a web browser application, an email manager application, a contact manager application, a calendar manager application, a word processing application, a spreadsheet application, as well as others.

MIME Security System

Figure 3:
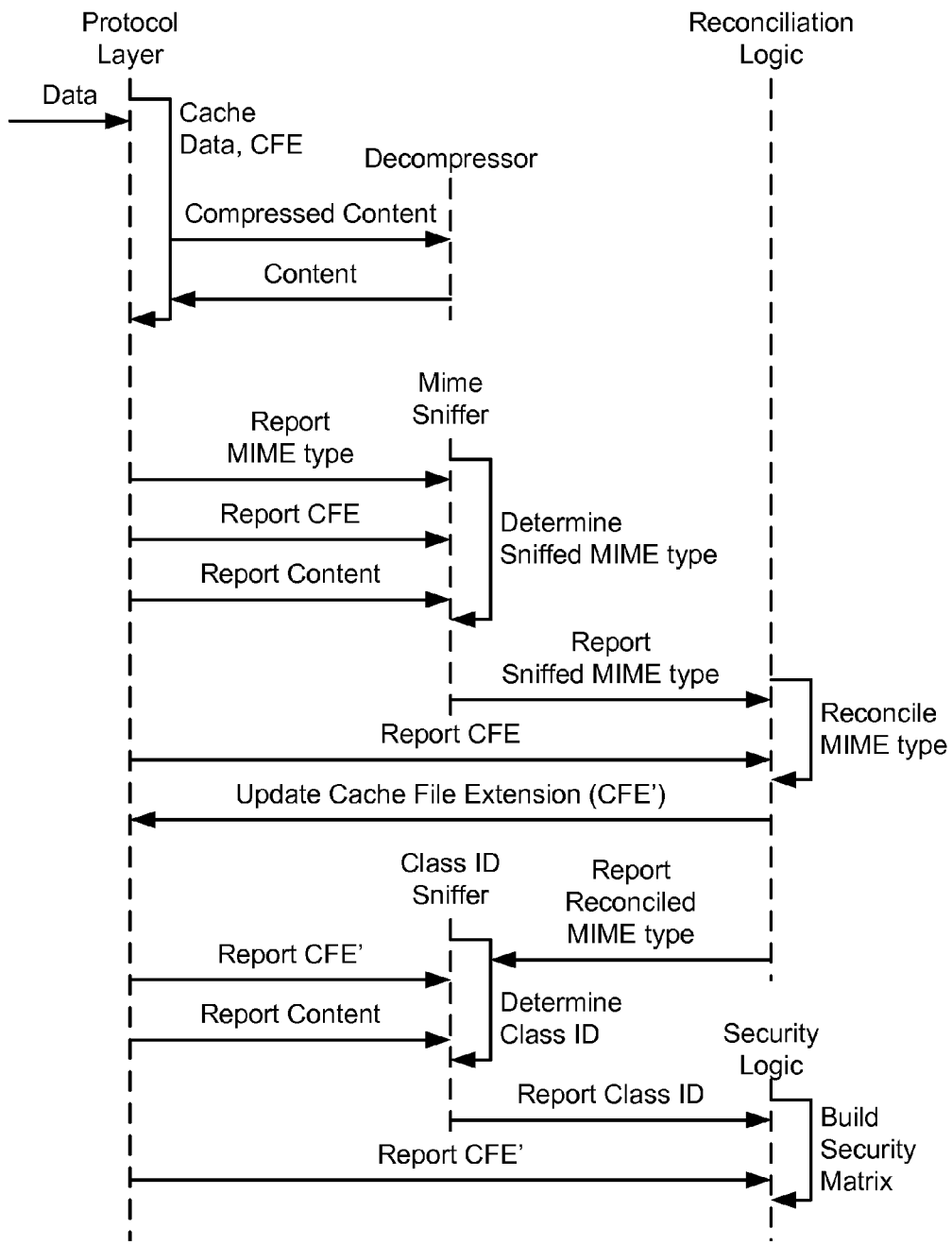
FIG. 3 is an illustration of an example security model; mom

Each device or machine is arranged to operate with an application program that includes a security manager. The security manager can be a single application program, or a set of modular programs that are arranged to cooperate with one another. FIG. 3 is an illustration of an example security model that applies security metrics to prevent un-trusted data/objects from creating security breaches on a machine. The example illustrated in FIG. 3 includes modules for: a protocol layer, a MIME sniffer, reconciliation logic, a class ID sniffer, and a security logic. The illustrated modules are functional partitions that can be implemented as separated program modules, combined into a single program module, or partitioned in a completely different manner.

Example protocol layers that can be employed include an HTTP protocol layer, a TCP/IP protocol layer, an FTP protocol layer, and a WAP protocol layer, to name a few. In one example, data (or an object) is received by the protocol layer and cached as data with a specified filename. For this example, the cache filename (CFN) associated with the cached data has an associated file type, which typically is identified with a particular cache file extension (CFE). An example file extension is an "exe" file extension that is typically associated with a binary executable.

An optional decompressor can be employed to decompress any compressed data (content) such as data that is encrypted or archived (ARC, ZIP, etc). The protocol layer extracts a MIME type out of the received data and reports it to a MIME sniffer, along with the content (the data) and the cache file type (CFE). In one example, the protocol layer is an HTTP protocol layer and the MIME file type is extracted out of an HTTP tag.

The MIME sniffer is arranged to evaluate the data, the cache file type, and the reported MIME type to identify inconsistencies. When all of the sources (the reported MIME type, the cache file type, or the actual data) agree with one another, the reported MIME type and the sniffed MIME type are identical. However, the sniffed MIME type can be different from the reported MIME type when inconsistencies are found. For example, a reported MIME type that is tested as binary executable yields a sniffed MIME type of "executable" instead of "text".

The reconciliation logic receives the sniffed MIME type and the reported cache file type (e.g., CFE). The reported CFE is optionally replaced with an updated cache file extension (CFE') to minimize security risk when a reported MIME type does not match the sniffed MIME type and the CFE. The changed cache file type (through changing the cache file extension) can be used to prevent the execution of un-trusted data.

A class ID sniffer receives the content, the updated cache file type, and the reconciled MIME type, and is arranged to determine an appropriate class identifier (Class ID). The class ID and the updated cache file type is used by the security logic to build a security matrix that can be used in further processing the data.

The cache file is not necessarily created in every instance. When the cache file does not exist, the data may be directly evaluated by each relevant system component as required. For example, the MIME sniffer may evaluate the data (or buffered data) without consideration of the reported CFE since the cache file is non-existent. Similarly, the reconciliation logic may evaluate the data (or buffered data) to determine if the data conforms with the reported sniffed MIME type without considering the reported CFE. Also, the class ID sniffer may compare the reported reconciled MIME type to the data without consideration of the CFE. The absence of a cache file does not impact the creation or application of the security matrix. A null entry can be created in the security matrix for the CFE when a cache file is not created.

Example Security Matrix

Figure 4A:
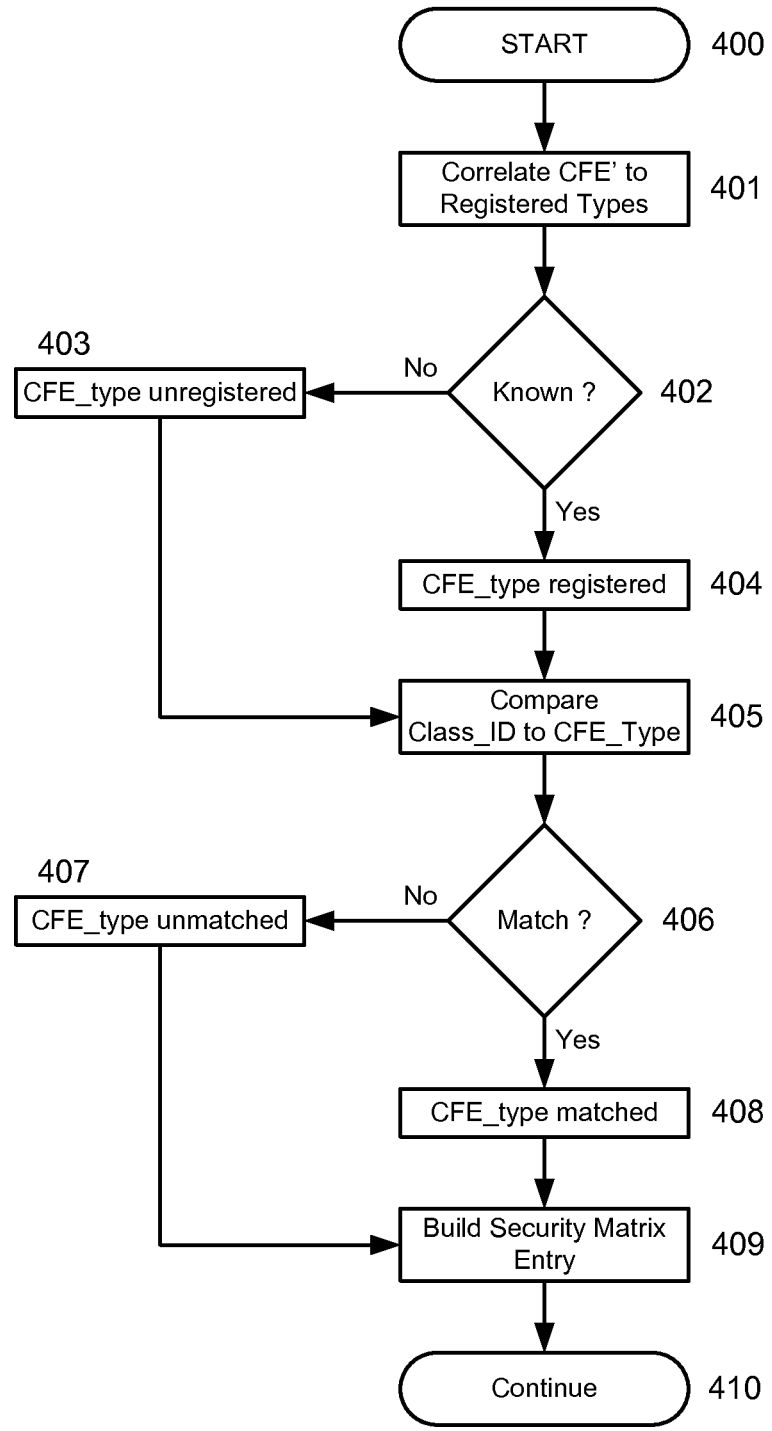
FIG. 4A is a diagram illustrating an example process flow for building a security matrix.

FIG. 4A is a diagram illustrating an example process flow for building a security matrix such as that shown in FIG. 4B. Processing begins at block 400 and continues to block 401.

At block 401, the updated cache file extension (or cache file type) is correlated with registered types on the machine. In one example, a registration procedure is employed by each application program on the machine such that every file type associated with that application program has a corresponding registered file type. The file types that are registered with the various application programs are compared to the cache file extension (or cache file type).

Processing continues from block 401 to decision block 402. At decision block 402, the machine evaluates whether or not the cache file extension (CFE') is matched to a known file extension. Processing flows from decision block 402 to block 403 when a known file extension is not found (CFE_type unregistered). Alternatively, processing flows from decision block 402 to block 404 when a known file extension is found (CFE_type registered).

Processing continues from blocks 403 and 404 to block 405. At block 405, the sniffed class ID is compared to the CFE_type that was identified based on the file extension. At decision block 406, the machine evaluates whether or not the cache file extension (CFE') is matched to a sniffed class ID.

Processing flows from decision block 406 to block 407 when the CFE_type matches the sniffed class ID (CFE_type matched). Alternatively, processing flows from decision block 406 to block 408 when the CFE type matches the sniffed class ID (CFE_type matched).

As described previously, the cache file may not created in each and every instance. Whenever the cache file is not created, the correlation of registered types and the related matching procedures described in FIG. 4A by blocks 400-410 are determined by evaluating the data instead of the cache file types (CFE, CFE', etc.)

The above described determinations are arranged in a matrix as illustrated in FIG. 4B. For the example security matrix of FIG. 4B: the first column indicates a doc-host class ID (DC), the second column indicates the cache file extension (CFE), the third column indicates the status for doc hosting (Doc Host), the fourth and fifth columns indicate the registered types associated with the corresponding doc-host class ID (DC) and/or cache file extension (CFE), and the sixth, seventh, and eighth columns are related to an optional set of user interfaces.

Each designated class identifier may correspond to an executable file type, or some other file type. In one example, the class identifier associated with the data or object corresponds to a data type that should be hosted within a browser window (referred to as "dochost"). For this example, the "Doc Host" column of the security matrix has a "Y" entry to indicate that "YES" the designated type should be hosted in a window. In another example, the class identifier associated with the data or object corresponds to a data type that should be directed to an executable shell outside of the current browser window (referred to as "shell execute"). For this example, the "Doc Host" column of the security matrix has an "N" entry to indicate that "NO" the designated type should not be hosted in a window and should instead by directed to a separately executable shell.

The registered types for the identified class ID (DC) and the cache file extension (CFE) may not match as illustrated by the fourth and fifth columns. For example, the class ID type and the CFE type are matched as designated by T1 for the class IDs identified as D1 and D2. However, the class ID type does not match the CFE type (i.e., T5 vs. T9) for the class ID identified by D3. This situation may occur when a CFE has two different registered types, or when a type is improperly registered.

An optional set of user interface (UI) definitions can be mapped to the security level assessment based on the DC, CFE, and registration types. In one example, the UI definitions include a field to indicate whether an open/save dialog box is to appear. In another example, the UI definitions include a field to indicate a danger level associated with the data. In still another example, the UI definitions include a field to indicate whether or not the user's selections for the given DC/CFE/types should have persistence or not. Additional UI/security definitions can be employed without departing from the spirit of the disclosure.

Example Security Logic

Figure 5:
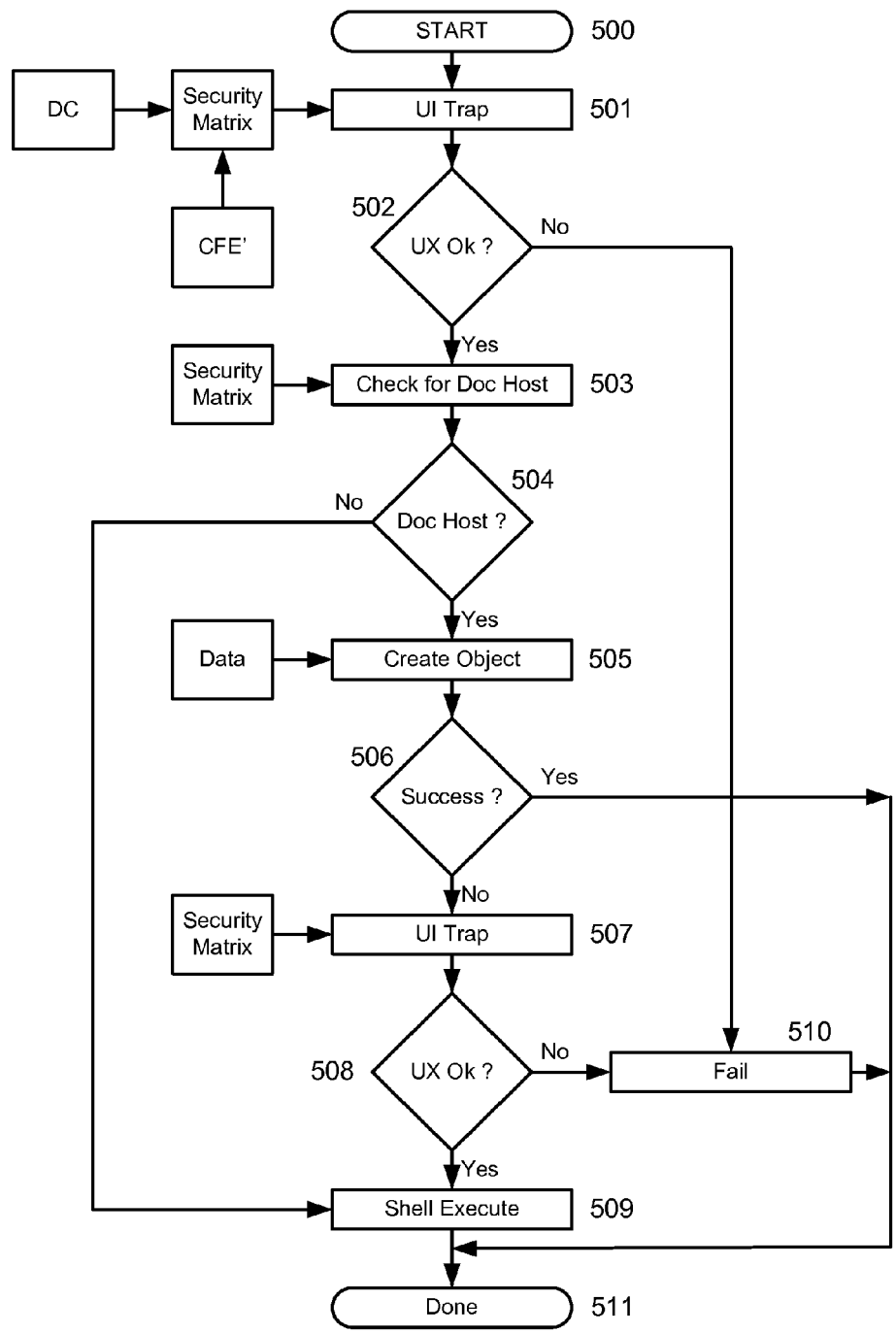
FIG. 5 is a diagram illustrating an example process flow for a security logic that utilizes a security matrix, arranged according to at least one aspect.

FIG. 5 is a diagram illustrating an example process flow for a security logic that utilizes a security matrix. Processing begins at block 500.

An optional user interface trap (UI Trap) is illustrated by block 501, where the UI can prompt the user based on the dochost class ID (DC) and the updated cache file extension (CFE'). The prompts provided to the user through the UI can be a dynamically configured such as that described by a security matrix (e.g., FIG. 4B). After the user responds to the request (e.g., selecting save, open, or cancel), processing continues to decision block 502. Based on the user experience (UX), the process either continues to block 503 or fails at block 510.

Continuing to block 503, the security matrix is referenced to determine whether or not doc-hosting should be employed. In one example, the security matrix is evaluated based on the doc-host class ID (DC). In another example, the security matrix is evaluated based on the cache file extension (CFE). In still another example, the security matrix is evaluated based on the updated cache file extension (CFE').

Processing continues from decision block 504 to block 505 when the security matrix indicates that hosting is required. Alternatively, processing flows from block 504 to block 509 when the security matrix indicates that hosting is not required.

At block 505, an object is created in the browser using data from the cache file (or buffered data that is not from the cache file, when the cache file is unavailable). In some instances, the data from the cache file is insufficient to satisfy the instantiation of the request object and processing flows from decision block 506 to block 507. In another example, the object is successfully created and processing flows from decision block 506 to block 511.

At block 507, another optional UI trap is employed to prompt the user for assistance in determining what action to take for the unsuccessful object creation. The prompts provided to the user are again dynamically configured such as that described by a security matrix (e.g., FIG. 4B). After the user responds to the request (e.g., selecting save, open, or cancel), processing continues to decision block 508. Based on the user experience (UX), the process either continues from decision block 508 to block 509, or fails at block 510.

At block 509, the data from the cache file (or buffered data that is not from the cache file, when the cache file is unavailable) is provided as a shell execute. The shell execute can once again provide an optional UI trap (not shown). After the shell execute is complete, processing is concluded at block 511.

Each of the described UI trap routines is arranged to request user authorization when necessary prior to proceeding. In one example, persistence from a prior user decision is employed such that the dialog box for the UI need not be provided. In another example, the dialog box for the UI provides a detailed warning message based on the danger level. Potential dangers include invalid data, malicious data, mis-registered file types, as well as bad or corrupted information that is extracted from the MIME header of an HTTP file. Although the security matrix is described with reference to a UI Definition, the security matrix (or table) can be used by various program modules that are unrelated to a UI.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining that a reported multipurpose internet mail exchange (MIME) type for a downloaded file is inconsistent with a sniffed MIME type for the file;
   replacing a file extension associated with the file with an updated file extension to reconcile the reported MIME type, the file extension being replaced based on the reported MIME type being inconsistent with the sniffed MIME type;
   reporting a reconciled MIME type to a class ID sniffer that is configured to determine a class ID for the file based on content of the file, the updated file extension, and the reconciled MIME type; and
   causing the file to be executed in an executable shell determined from a security matrix that includes the class ID and the updated file extension, the security matrix being configured to map a set of user interface definitions to a security level assessment based on the updated file extension, the class ID, and one or more associated registered types.

2. The method as described in claim 1, wherein the updated file extension is associated with the class ID.

3. The method as described in claim 1, wherein the computing system comprises a client of a web server.

4. The method as described in claim 1, wherein the executable shell is used when the sniffed MIME type comprises an executable.

5. The method as described in claim 1, wherein the executable shell is used when the sniffed MIME type indicates that data in the file is corrupt or inconsistent with the reported MIME type.

6. The method as described in claim 1, further comprising parsing data in the file to determine whether the file includes one or more of a virus, a Trojan horse, a worm, or an electronic mail replicator.

7. A system comprising:
   one or more memories storing executable instructions; and
   one or more processors configured to execute the instructions to cause the client device to reconcile a reported multipurpose internet mail exchange (MIME) type for a file downloaded by the client device by performing operations including:
   determining that a reported MIME type for the file is inconsistent with a sniffed MIME type for the file;
   reconciling the reported MIME type by replacing an extension associated with the file with an updated extension to generate a reconciled MIME type responsive to determining that the reported MIME type is inconsistent with the sniffed MIME type; and
   building a security matrix based on the updated extension and a class identifier (ID) associated with the file, the security matrix configured to:
   designate an executable shell in which the file is to be executed when the reported MIME type is inconsistent with the sniffed MIME type; and
   map a set of user interface definitions to a security level assessment based on the class ID, the updated extension, and one or more associated registered types.

8. The system as described in claim 7, wherein the client device comprises a client of a web server.

9. The system as described in claim 7, wherein the operations further include directing the file to the executable shell when data in the file is executable and the file is untrustworthy based on the reported MIME type being inconsistent with the sniffed MIME type.

10. The system as described in claim 7, wherein the operations further include applying one or more security metrics to data in the file to identify whether the data is associated with an executable behavior.

11. The system as described in claim 7, wherein the updated extension is associated with the class ID.

12. The system as described in claim 7, wherein the operations further include parsing data in the file to determine whether the file is untrustworthy.

13. The system as described in claim 7, wherein the security enforcement model is further configured to parse data in the file when the file is cached in memory prior to said reconciling.

14. The system as described in claim 7, wherein the operations further include parsing the data in the file to determine whether the file includes one or more of a virus, a Trojan horse, a worm, or an electronic mail replicator.

15. The system as described in claim 7, wherein the reported MIME type is extracted from a hypertext transfer protocol (HTTP) tag associated with the file.

16. One or more computer-readable storage devices storing executable instructions that are executable by a computing system to cause the computing system to perform operations comprising:

implementing a security enforcement model configured to use multipurpose internet exchange (MIME) type information associated with a file that is downloaded by the computing system to impose security restrictions on execution of the file based on authentication of a reported MIME type of the file;

evaluating the reported MIME type of the file to identify whether the file is associated with data that is inconsistent with the security enforcement model;

replacing a file extension associated with the file with an updated file extension based on an indication that the file is associated with data that is inconsistent with the security enforcement model, the updated file extension being usable by security logic to build a security matrix that is configured to map a set of user interface definitions to a security level assessment based on the updated file extension, one or more associated registered types, and a class identifier associated with the file and the updated extension; and executing the file in an executable shell determined from the security matrix.

17. One or more computer-readable storage devices as described in claim 16, wherein the operations further comprise:

identifying a sniffed MIME type based on the data, the file extension, and the reported MIME type; and identifying that the data is inconsistent with the security enforcement model by at least ascertaining that the reported MIME type does not match the sniffed MIME type.

18. One or more computer-readable storage devices as described in claim 16, wherein the executable shell is external to a browser that downloaded the file.

19. One or more computer-readable storage devices as described in claim 16, wherein the operations further comprise parsing the data from the file to identify whether the file is associated with an executable behavior.

20. One or more computer-readable storage devices as described in claim 16, wherein said evaluating the reported MIME type includes comparing the reported MIME type to a sniffed MIME type to identify inconsistencies between the reported MIME type and the sniffed MIME type.

* * * * *